(12) United States Patent
Ji et al.

(10) Patent No.: US 12,285,826 B2
(45) Date of Patent: Apr. 29, 2025

(54) MESHING STRUCTURE FOR PLATE WELDING AND TACK-FREE WELDING DEVICE AND METHOD

(71) Applicant: JIANGSU XCMG CONSTRUCTION MACHINERY RESEARCH INSTITUTE LTD., Jiangsu (CN)

(72) Inventors: Ang Ji, Jiangsu (CN); Can Wang, Jiangsu (CN); Liping Zhang, Jiangsu (CN)

(73) Assignee: JIANGSU XCMG CONSTRUCTION MACHINERY RESEARCH INSTITUTE LTD. (CN)

(*) Notice: Subject to any disclaimer, the term of this patent is extended or adjusted under 35 U.S.C. 154(b) by 0 days.

(21) Appl. No.: 17/802,005

(22) PCT Filed: Oct. 28, 2021

(86) PCT No.: PCT/CN2021/126880
§ 371 (c)(1),
(2) Date: Feb. 2, 2023

(87) PCT Pub. No.: WO2023/005025
PCT Pub. Date: Feb. 2, 2023

(65) Prior Publication Data
US 2024/0217037 A1    Jul. 4, 2024

(30) Foreign Application Priority Data
Jul. 30, 2021   (CN) .......................... 202110872200.6

(51) Int. Cl.
*B23K 37/00*     (2025.01)
*B23K 26/38*     (2014.01)
*B23K 28/02*     (2014.01)

(52) U.S. Cl.
CPC .............. *B23K 37/00* (2013.01); *B23K 26/38* (2013.01); *B23K 28/02* (2013.01)

(58) Field of Classification Search
None
See application file for complete search history.

(56) References Cited

U.S. PATENT DOCUMENTS 8,263,898 B2 * 9/2012 Alber ................. B23K 37/0235
219/121.64

FOREIGN PATENT DOCUMENTS

CN   204934893 U *  1/2016
CN   108817647 A * 11/2018 ........... B23K 20/122
(Continued)

*Primary Examiner* — Devang R Patel (57) ABSTRACT

A meshing structure for plate welding, and a tack-free welding device and method are provided. The device comprises a connecting frame, a welding gun, and a cutting mechanism, the welding gun is fixed on the connecting frame, and the cutting mechanism is connected to the connecting frame. The meshing structures are disposed on welded plates, and after being assembled, the two plates can be restrained by the meshing structures in multiple dimensions. Before welding, edges of the plates are cut according to the form of the meshing structures, then the plates are assembled and meshed; after the position of the welding gun is adjusted, the cutting mechanism and the welding gun are driven by a welding robot or a special welding machine to move along a weld; and the meshing structures are removed by the cutting mechanism, and then normal welding is performed by the welding gun.

12 Claims, 5 Drawing Sheets

(56) References Cited

FOREIGN PATENT DOCUMENTS

| | | | | | |
|---|---|---|---|---|---|
| CN | 110640299 | A | * | 1/2020 | ........... B23K 20/122 |
| JP | 2004249305 | A | * | 9/2004 | ............. B23K 26/26 |

* cited by examiner

Fig. 7 ited States Patent

MESHING STRUCTURE FOR PLATE WELDING AND TACK-FREE WELDING DEVICE AND METHOD

FIELD

The invention relates to a meshing structure for plate welding, and a tack-free welding device and method, and belongs to the technical field of welding of regular welds.

BACKGROUND

The welds of straight arm structures, which are one of the common regular structural members of engineering machines, are generally long straight butt welds. Due to large local stress and strain during the welding process, many tack-welds are used before welding the long straight welds to guarantee the stability of these structures during the welding process, so as to ensure that the gap between two plates remains constant during the welding process.

The welds of circular structures, which are also one of the common regular structures of engineering machines, are generally circumferential butt welds. Because of the large local stress and strain in the welding process, many tack-welds are used before welding of the circumferential welds to guarantee the stability of these structures in the welding process, so as to prevent the welds from cracking during the welding process. In addition, the circular structures are generally tack-welded in cooperation with a rotary table, so the welding process of the circumferential welds is similar to that of straight welds.

The workload of welding these two types of regular welds is large, so such regular structures are generally automatically welded. Since the welding speed is set in advance, the tack-welds cannot be particularly processed by welders in the automatic welding process. In order to prevent large reinforcement, that may compromise the appearance quality, from being formed at tack-welds after welding, the tack-welds need to be manually polished and leveled before welding, that is, two plates are connected and fixed merely by means of the roots of the tack-welds.

For example, in a case where two C-shaped straight plates with a length of 10 m are welded by a single operator, the process before welding is as follows: (1) the plates are placed in a welding fixture after being bent, the positions of these two plates are adjusted to ensure that the two ends of the plates are aligned without misalignment, and this process takes about 20 min; (2) tack welding is performed in order under the condition that the tool is clamped, the length of tack-welds is 50 mm, and the spacing of tack welding is 200-500 mm, for example, when the spacing of tack welding is 400 mm, 50 tack-welds are needed, and this process takes about 25 min; (3) the tack-welds are polished through an angle grinder, and the whole process takes about 35 min; and (4) the two plates are transported to a special welding machine to be welded, and the welding process takes about 30 min.

During actual implementation, the existing technical solutions have the following defects: (1) from the perspective of value flow, although many high-efficiency welding methods have been applied to the welding process of such large and long regular welds, the "tack welding-polishing" process before welding takes too much time (non-value creating time), which not only reduces the overall production efficiency, but also fails to bring the advantages of the high-efficiency welding methods into full play, so "tack welding-polishing" has become a major bottleneck restraining the improvement of the production efficiency of the large and long regular structures; (2) due to the weak quality awareness of welders, "blind welding" may be performed, leading to incomplete penetration of the roots of tack-welds and cracking of the tack-welds during welding; (3) although many tack-welds are used for splicing, only the roots of the welds have a substantive effect (the upper portions of the welds are polished away), which results in substantial waste; (4) a special welding fixture is needed, which increases the cost.

SUMMARY

The objective of the invention is to provide a meshing structure for plate welding, and a tack-free welding device and method, which cut plates along a specific path, so that two plates can be restrained in certain dimensions through the meshing structures on edges of the plates after being cut, bent, or coiled, thus eliminating the "tack welding-polishing" process; and formal welding is started after the plates are directly assembled and meshed on a welding station, thus solving the problems of poor quality, high cost, and low efficiency caused by tack-welds.

To fulfill the above objective, the invention adopts the following technical solution.

In one aspect, the invention provides a meshing structure for plate welding. The meshing structures are located on edges of two plates and are used for restraining the two plates from moving relative to each other after the two plates are assembled and meshed together.

Further, the meshing structures comprise triangular, rectangular, trapezoidal, sawtooth, or barb-shaped structures that are disposed on the edges of the two plates and matched with each other.

Further, the meshing structures comprise dovetail structures that are disposed on the edges of the two plates and matched with each other.

Further, the meshing structures further comprise a rigid backing fixed on back sides of the meshing structures.

Further, the rigid backing is fixed on the back sides of the meshing structures through clamps or by performing some spot-welding on contact positions of edges of the rigid backing and the meshing structures.

Further, small-diameter tack welding is performed on the meshing structures.

Further, a width of the meshing structures ranges from 0.5 mm to 6 mm.

In another aspect, the invention provides a tack-free welding device, comprising a connecting frame, a welding gun, and a cutting mechanism, wherein the welding gun is fixed on the connecting frame, the cutting mechanism is fixedly connected to the connecting frame through a pose adjustment mechanism, the cutting mechanism is used for removing the meshing structure at a weld of plates, and the welding gun is used for performing welding in a non-connected area after the meshing structures are removed.

Further, the cutting mechanism comprises a cutter body and a cutting blade, and the cutting blade is rotatably connected to a lower end of the cutter body.

Further, the cutting mechanism is a laser cutting head.

In another aspect, the invention provides a tack-free welding method for straight welds, which uses the tack-free welding device and comprises:

Cutting edges of plates according to a form of the meshing structure;

Assembling and meshing the cut plates, and fixing the plates by performing tack welding on ends of a weld, or by randomly performing small-parameter tack welding on the meshing structures; or, fixing a rigid backing on back sides of the meshing structures through clamps or by performing some tack welding on contact positions of edges of the rigid backing and the meshing structures;

Adjusting a position of the welding gun and a position of the cutting mechanism until the welding gun and the cutting mechanism are aligned with a center of the weld; and Enabling the cutting mechanism and the welding gun to move along the weld, removing the meshing structures by the cutting mechanism, and then performing welding in a non-contacted area by the welding gun after the meshing structures are removed by the cutting mechanism.

Further, at least 80% of the meshing structures in a width direction are removed by the cutting mechanism.

Further, when the cutting mechanism comprises the cutter body and the cutting blade, a lower edge of the cutting blade is not higher than a root of the weld.

Further, a rotation direction of the cutting blade is a direction allowing swarfs to fly away from the welding gun.

In another aspect, the invention provides a tack-free welding method for circumferential welds, which uses the tack-free welding device and comprises:

Cutting edges of plates according to a form of the meshing structure such as the triangular form, the rectangular form, the trapezoidal form, the sawtooth form, and the barb-shaped form, and then coiling the plates; or, coiling the plates first, and then cutting the edges of the plates according to the form of the meshing structure;

Assembling and meshing the cut and coiled plates, and fixing the plates by randomly performing some tack welding on the meshing structures; or, fixing a round or circular rigid backing on back sides of the meshing structures by performing some tack welding on contact positions of outer edges of the rigid backing and the meshing structures, so as to obtain a circular structural member;

Placing the circular structural member on a rotary table, and adjusting a position of the welding gun and a position of the cutting mechanism until the welding gun and the cutting mechanism are aligned with a center of a weld; and Keeping the cutting mechanism and the welding gun fixed, and driving, by the rotary table, the circular structural member to rotate, removing the meshing structures by the cutting mechanism, and then performing welding in a non-connected area by the welding gun after the meshing structures are removed.

Further, according to the tack-free welding method for circumferential welds, at least 80% of the meshing structures in a width direction are removed by the cutting mechanism.

Further, according to the tack-free welding method for circumferential welds, when the cutting mechanism comprises the cutter body and the cutting blade, a lower edge of the cutting blade is not higher than a root of the weld.

Further, a rotation direction of the cutting blade is a direction allowing swarfs to fly away from the welding gun.

The invention has the following beneficial technical effects.

(1) The invention gives full play of the advantages of the existing advanced laser cutting techniques and cuts plates along a special path to obtain a meshing structure, so that the plates are self-restrained in different dimensions; these restrictions are removed by cutting before welding, so that the non-value creating process of "tack welding-polishing" is eliminated, the proportion of value creating time during the welding process of large and long regular structural members is greatly increased, and an effect complementing the high-efficiency welding methods is realized.

(2) By eliminating the "tack welding-polishing" process, labor and material costs are saved.

(3) Because the meshing structure is removed before welding, a favorable gap is provided to effectively guarantee complete penetration of the root of welds, improving the quality of the welds and avoiding potential quality hazards caused by terrible tack-welds.

(4) The meshing structure provided by the invention may be in three dimensional restriction forms to meet different restraining requirements of straight welds, thus having good process completeness.

Wherein, 1, connecting frame; 2-1, welding gun; 2-2, welding wire; 3, pose adjustment mechanism; 4-1, cutter body; 4-2, cutting blade; 5-1, plate; 5-2, weld; 5-3, meshing structure; 6, rigid backing; 7-1, laser cutting head; 7-2, laser.

DETAILED DESCRIPTION

The invention will be further described below in conjunction with specific embodiments. The following embodiments are merely used to more clearly explain the technical solutions of the invention, and should not be construed as limitations of the protection scope of the invention.

As mentioned above, existing technical solutions have the following defects in the implementation process: the "tack welding-polishing" process before welding takes too much time, and the problems of poor quality, high cost, and low efficiency are caused by tack-welds.

Figure 1:
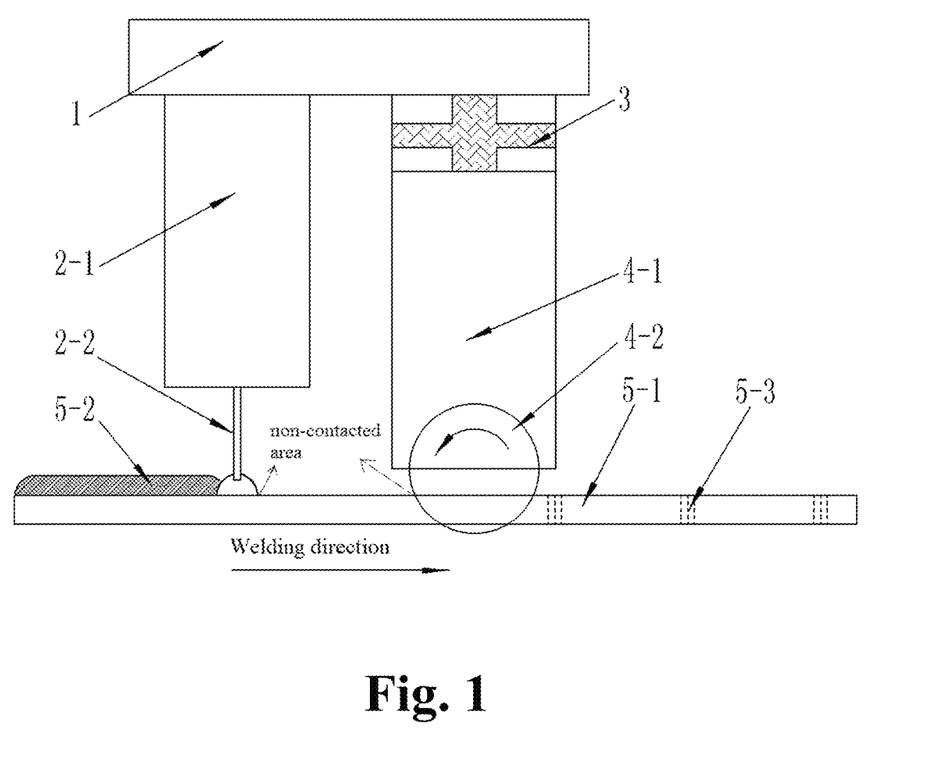
FIG. 1 is a structural diagram of a tack-free welding device according to one embodiment of the invention.

In view of this, in one embodiment, the invention provides a tack-free welding device which, as shown in FIG. 1, comprises a connecting frame 1, a welding gun 2-1, a welding wire 2-2, a pose adjustment mechanism 3, a cutter body 4-1, a cutting blade 4-2, welded plates 5-1, a weld 5-2, and meshing structures 5-3.

Wherein, the connecting frame 1 is fixed at a tool end of a welding robot or a special welding machine, the welding gun 2-1 is fixed on the connecting frame, and the cutter body 4-1 is fixedly connected to the connecting frame 1 through the pose adjustment mechanism 3. The cutting blade 4-2 is located at a lower end of the cutter body 4-1, and the pose adjustment mechanism 3 is used to adjust the position and pose of the cutting blade 4-2. The meshing structures 5-3 are disposed on the welded plates 5-1, and after the two plates 5-1 are assembled together, the degree of freedom of the two plates 5-1 is restrained by the meshing structures 5-3 in multiple dimensions.

Figure 2:
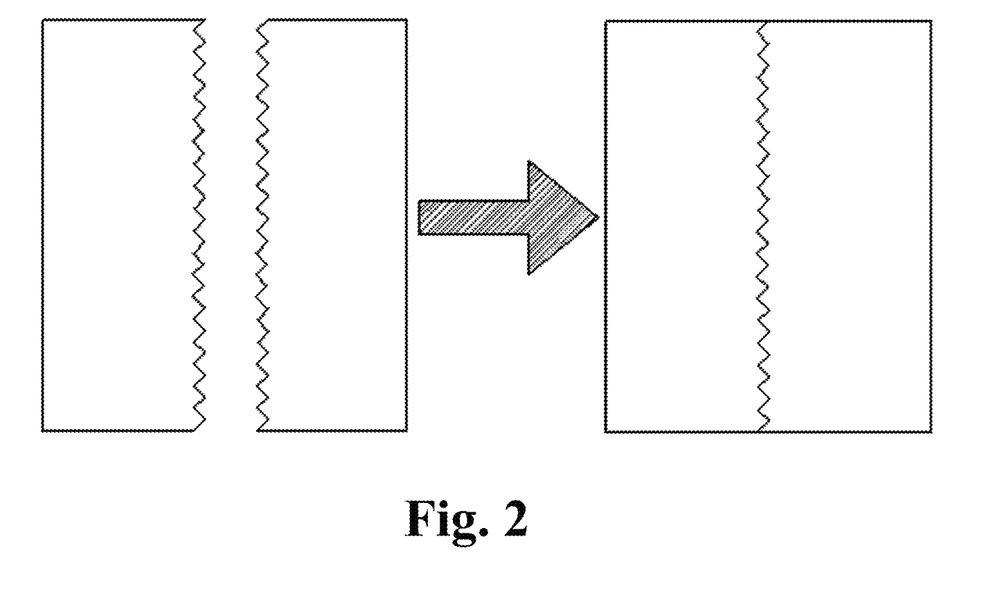
FIG. 2 is a schematic diagram of a triangular meshing structure in a one-dimensional restriction form.
Figure 3:
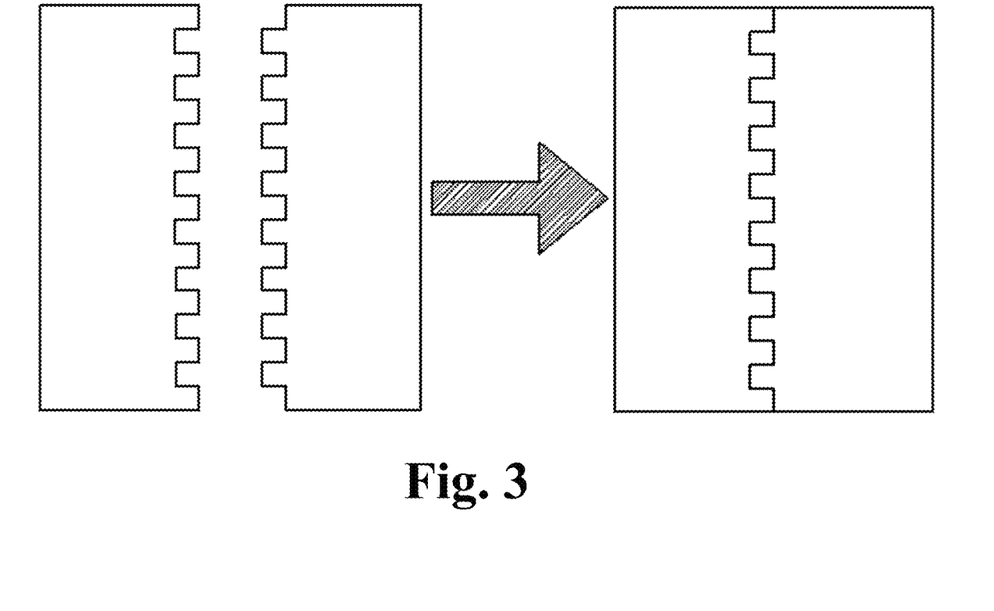
FIG. 3 is a schematic diagram of a rectangular meshing structure in a one-dimensional restriction form.

The meshing structures 5-3 may be in a one-dimensional restriction form, for example, the meshing structures 5-3 may be triangular or rectangular, as shown in FIG. 2 and FIG. 3, and in this case, the meshing structures 5-3 can prevent the plates 5-1 on two sides of the weld from moving in a direction parallel to the weld during the welding process. The meshing structures may also be trapezoidal structures or sawtooth structures, in addition to the triangular structures and the rectangular structures.

On the basis of the one-dimensional restriction form, some tack welding may be performed at ends of the weld to simply fix the two plates 5-1 to realize two-dimensional restriction of the plates 5-1, so that the plates will not be separated from each other during the welding process.

Figure 4:
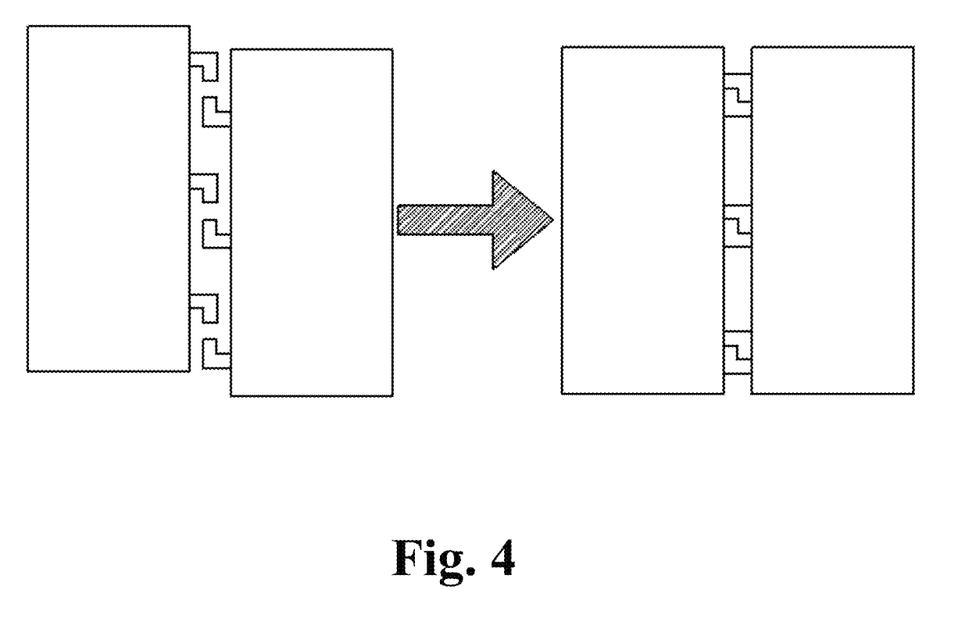
FIG. 4 is a schematic diagram of a barb-shaped meshing structure in a two-dimensional restriction form.
Figure 5:
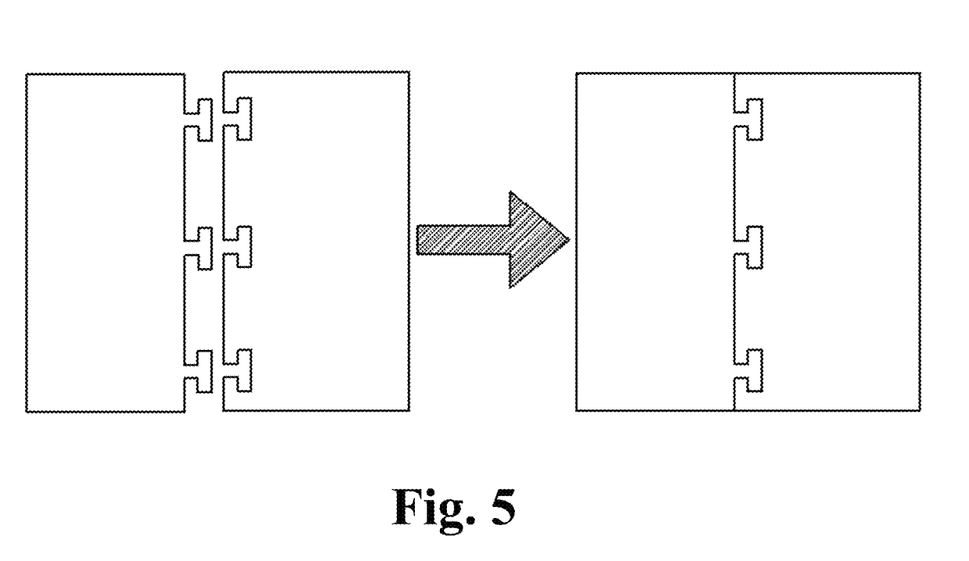
FIG. 5 is a schematic diagram of a dovetail meshing structure in a two-dimensional restriction form.

The meshing structures 5-3 may also be in other two-dimensional restriction forms, such as a barb-shaped structure and a dovetail structure shown in FIG. 4 and FIG. 5, so that the plates 5-1 on the two sides of the weld will not move in a direction perpendicular to the weld and in a direction parallel to the weld during the welding process.

Figure 6:
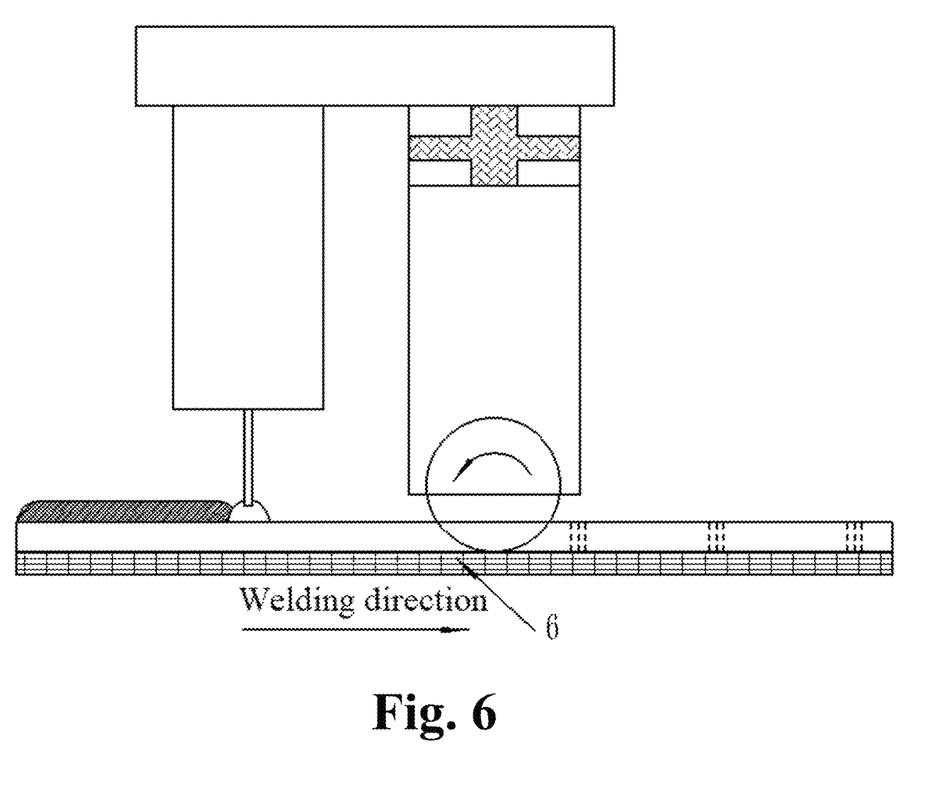
FIG. 6 is a schematic diagram of a meshing structure in a three-dimensional restriction form during welding.

On the basis of the one-dimensional restriction and the two-dimensional restriction, a rigid backing 6 may be used and fixedly connected to the two plates to realize a three-dimensional restriction form of the meshing structures 5-3, as shown in FIG. 6.

In a specific implementation, on the basis of the one-dimensional restriction, the rigid backing 6 may be fixed on back sides of the two plates through clamps to realize three-dimensional restriction.

In another implementation, on the basis of the one-dimensional restriction, the rigid backing 6 may be fixed on the back sides of the meshing structures 5-3 by randomly performing some tack welding on contact positions of edges of the rigid backing 6 and the meshing structures 5-3, so as to realize three-dimensional restriction.

In another implementation, on the basis of the two-dimensional restriction shown in FIG. 4 and FIG. 5, the rigid backing 6 may be fixed on a back side of the weld of the two plates through clamps to realize three-dimensional restriction.

In another implementation, on the basis of the two-dimensional restriction shown in FIG. 4 and FIG. 5, the rigid backing 6 may be fixed on back sides of the meshing structures 5-3 by randomly performing some tack welding on contact positions of edges of the rigid backing 6 and the meshing structures 5-3, so as to realize three-dimensional restriction.

Wherein, the rigid backing 6 may be provided with a groove to allow a weld pool to flow down.

In another implementation, some small-diameter tack welding may be randomly performed on the meshing structures 5-3 in the one-dimensional restriction form to realize three-dimensional restriction.

In another implementation, a little of small-diameter tack welding may be randomly performed on the meshing structures 5-3 in the two-dimensional restriction form, shown in FIG. 4 and FIG. 5, to realize three-dimensional restriction.

When the weld is a circumferential weld, the meshing structures 5-3 may be in the one-dimensional or two-dimensional restriction form shown in FIG. 2-FIG. 4. On this basis, a little of small-diameter tack welding may be randomly performed on the meshing structures 5-3 in the one-dimensional or two-dimensional restriction form to realize three-dimensional restriction; or, a rigid backing may be used for fixing the plates. When the rigid backing is used, the rigid backing is circular or round, and a little of tack welding is performed on contact positions of the outer edges of the rigid backing and the meshing structures 5-3 to fix the rigid backing on the back sides of the meshing structures 5-3 to realize three-dimensional restriction.

It should be noted that, in a case where small-parameter tack welding is performed on the meshing structures, welding spots will be removed synchronously when the meshing structures are removed later.

The distribution of the meshing structures 5-3 in a length direction of the weld may be adjusted according to the structural rigidity and process of the plates 5-1.

The width of the meshing structures 5-3 (the height of protrusion or the depth of recess in one side of the plates) may be adjusted according to the process, and ranges from 0.5 mm to 6 mm.

Because a heat source used for fusion welding may melt part of base metal, the cutting blade 4-2 should be able to remove at least 80% of the meshing structures 5-3 in a width direction.

In another embodiment, the invention provides a tack-free welding method for straight welds, which uses the device shown in FIG. 1 and comprises the following a-e.

a. According to actual restrictive dimension requirements, edges of the plates 5-1 are cut in a manner shown in FIG. 2-FIG. 5.

b. The plates 5-1 are assembled and locked according to the form of the meshing structures, and are fixed by performing tack welding on ends of a weld, or by randomly performing small-diameter tack welding on the meshing structures, or by means of the rigid backing 6; if the rigid backing 6 is used, the rigid backing 6 is fixed on a back side of the weld by means of a clamp or by performing some tack welding on contact positions of the edges of the rigid backing 6 and the meshing structures.

c. The tool end of the welding robot or the special welding machine is operated to adjust the position of the welding gun 2-1 and then the position of the cutting blade 4-2 is adjusted until the welding gun 2-1 and the cutting blade 4-2 are aligned with the center of the weld, and a lower edge of the cutting blade 4-2 should not be higher than a root of the weld.

d. The cutter body 4-1 is started, as shown in FIG. 1, the rotation direction of the cutting blade 4-2 matches the welding direction to ensure that swarfs fly in a direction away from the welding gun; the cutting blade 4-2 and the welding gun 2-1 are driven by the welding robot or the special welding machine to move along the weld; the cutting blade 4-2 enters the plates to remove the meshing structures 5-3 one by one, the welding gun 2-1 starts an arc when reaching an initial point of the weld, and normal welding is performed through the welding gun 2-1 after the meshing structures 5-3 are removed by the cutting blade 4-2.

e. The welding gun 2-1 quenches the arc when finishing welding, and the cutter body 4-1 is stopped.

In another embodiment, the invention provides a tack-free welding method for circumferential welds, which uses the device shown in FIG. 1 and comprises the following a-e.

a. According to actual restrictive dimension requirements, edges of the plates 5-1 are cut in a manner shown in FIG. 2-FIG. 4, and then the plates are coiled; or, the plates 5-1 are coiled through a rotary table, and then the edges of the plates 5-1 are cut.

b. The plates 5-1 are assembled and locked according to the form of meshing structures, and are fixed by randomly performing some tack welding on the weld meshing structures 5-3 or by means of the rigid backing 6 to obtain a circular structural member.

If the rigid backing is used to fix the plates, the rigid backing is round or circular, and the round or circular backing is fixed on back sides of the meshing structures by performing some tack welding on contact positions of outer edges of the round or circular backing and the meshing structures 5-3 c. The circular structural member is placed on a rotary table, the position of the welding gun 2-1 is adjusted and then the position of the cutting blade 4-2 is adjusted until the welding gun 2-1 and the cutting blade 4-2 are aligned with the center of a weld, and a lower edge of the cutting blade 4-2 should not be higher than a root of the weld.
  d. The cutter body 4-1 is started, as shown in FIG. 1, the rotation direction of the cutting blade 4-2 matches the welding direction to ensure that swarfs fly in a direction away from the welding gun 2-1; the cutting blade 4-2 and the welding gun 2-1 are kept fixed, and the rotary table drives the circular structural member to rotate; the cutting blade 4-2 enters the plates 5-1 to remove the meshing structures 5-3 one by one, and then normal welding is performed through the welding gun 2-1.
  e. After all the meshing structures 5-3 are removed, the cutter body 4-1 is lifted, the welding gun 2-1 quenches an arc after finishing the remaining welding, and finally, the cutter body 4-1 is stopped.

Figure 7:
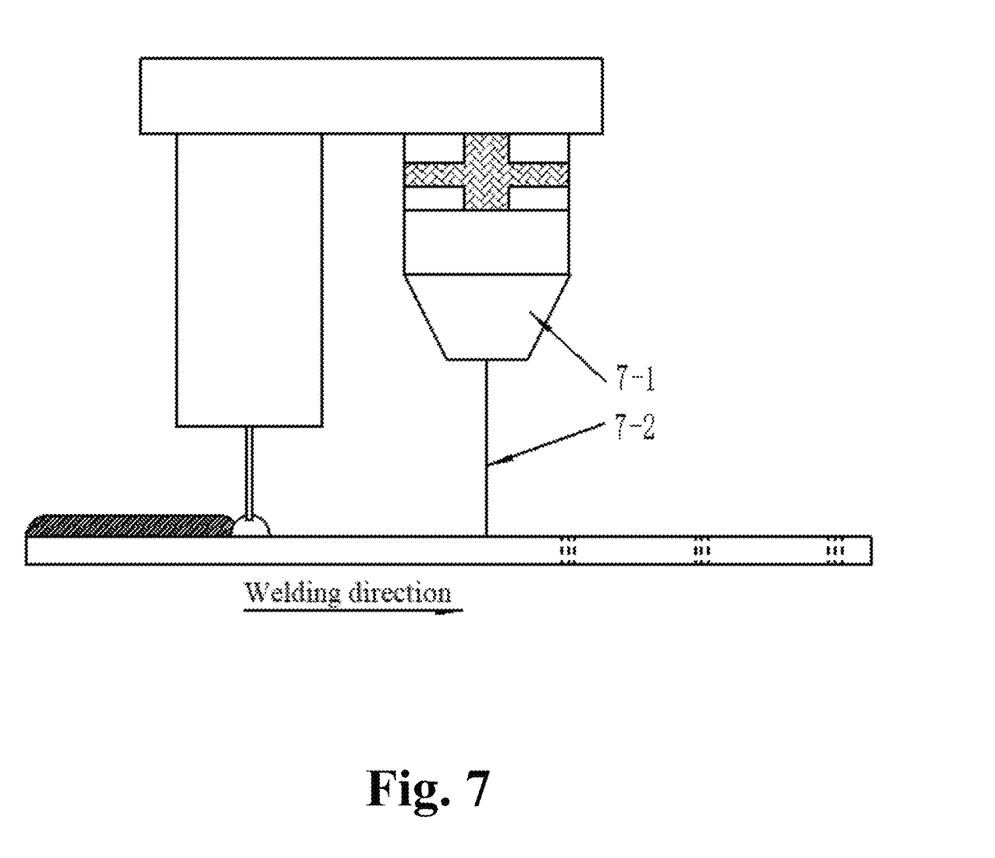
FIG. 7 is a structural diagram of a tack-free welding device according to another embodiment of the invention.

In another embodiment, as a substitution of the cutting blade 4-2, a laser cutting head 7-1 may be used to replace the cutter body 4-1, the laser cutting head 7-1 can realize linear or swing cutting, and as shown in FIG. 7, a laser 7-2 is used for cutting to remove the meshing structures 5-3. When the meshing structures are wide, a scanning laser may be used for cutting.

In another embodiment, the invention provides a tack-free welding method for straight welds, which uses the device shown in FIG. 7 and comprises the following a-e.

a. According to actual restrictive dimension requirements, edges of the plates 5-1 are cut in a manner shown in FIG. 2-FIG. 5.
  b. The plates 5-1 are assembled and locked according to the form of the meshing structures, and are fixed by performing tack welding on ends of a weld, or by randomly performing small-parameter tack welding on the meshing structures, or by means of a rigid backing 6.
  c. The tool end of the welding robot or the special welding machine is operated to adjust the position of the welding gun 2-1 and then the position of the laser cutting head 7-1 is adjusted until the welding gun 2-1 and the laser cutting head 7-1 are aligned with the center of a weld.
  d. The laser cutting head 7-1 is started, as shown in FIG. 7; the laser cutting head 7-1 and the welding gun 2-1 are driven by the welding robot or the special welding machine to move along the weld; the laser cutting head 7-1 enters the plates to remove the meshing structures 5-3 one by one, the welding gun 2-1 starts an arc when reaching an initial point of the weld, and normal welding is performed through the welding gun 2-1 after the meshing structures 5-3 are removed by the laser cutting head 7-1.
  e. The welding gun 2-1 quenches the arc after finishing welding, and the laser cutting head 7-1 is stopped.

In another embodiment, the invention provides a tack-free welding method for circumferential welds, which uses the device shown in FIG. 7 and comprises the following a-e.

a. According to actual restrictive dimension requirements, edges of the plates 5-1 are cut in a manner shown in FIG. 2-FIG. 4, and then the plates are coiled; or, the plates 5-1 are coiled through a rotary table, and then the edges of the plates 5-1 are cut.
  b. The plates 5-1 are assembled and locked according to the form of meshing structures, and are fixed by randomly performing some tack welding on the meshing structures 5-3, or by means of a round or circular backing to obtain a circular structural member.
  c. The circular structural member is placed on the rotary table, and the position of the welding gun 2-1 is adjusted and then the position of the laser cutting head 7-1 is adjusted until the welding gun 2-1 and the laser cutting head 7-1 are aligned with the center of a weld.
  d. The laser cutting head 7-1 is started, as shown in FIG. 1; the laser cutting head 7-1 and the welding gun 2-1 are kept fixed, and the rotary table drives the circular structural member to rotate; the laser cutting head 7-1 enters the plates 5-1 to remove the meshing structures 5-3 one by one, and then normal welding is performed by the welding gun 2-1.
  e. After all the meshing structures 5-3 are removed, the laser cutting head 7-1 is lifted, the welding gun 2-1 quenches an arc after finishing the remaining welding, and the laser cutting head 7-1 is stopped.

It should be particularly noted that the key of the application lies in tack-free welding realized by "self-meshed fixing" and "removal" before welding of the plates, so the meshing structures illustrated in this specification are merely illustrative ones, and other meshing structures, meshing point removal manners or transformations of these illustrative meshing structures also fall within the protection scope of the invention.

Although the invention has been disclosed above with reference to preferred embodiments, these embodiments are not used to limit the invention. All technical solutions obtained by equivalent substitutions or transformations should fall within the protection scope of the invention.

What is claimed is:

1. A welding method for straight welds with a tack-free welding device which comprises a connecting frame (1), a welding gun (2-1), and a cutting mechanism, wherein the welding gun (2-1) is fixed on the connecting frame (1), the cutting mechanism is fixedly connected to the connecting frame (1) through a pose adjustment mechanism (3), the method comprising the following steps:

cutting edges of two plates according to a form of a meshing structure for restraining the two plates from moving relative to each other after the two plates are assembled and meshed together;
  assembling and meshing the cut plates, and fixing the cut plates by performing tack welding on ends of a weld, or by randomly performing tack welding on the meshing structures; or, fixing a rigid backing on back sides of the meshing structures through clamps or by performing tack welding on contact positions of edges of the rigid backing and the meshing structures;
  adjusting a position of the welding gun (2-1) and a position of the cutting mechanism until the welding gun (2-1) and the cutting mechanism are aligned with a center of the weld; and enabling the cutting mechanism and the welding gun (2-1) to move along the weld, removing the meshing structures by the cutting mechanism, and then performing, by the welding gun (2-1), welding at the weld in a non-contacted area, from an initial point of the welding to a position of the cutting mechanism, formed after the meshing structures are removed by the cutting mechanism.

2. The welding method for straight welds according to claim 1, wherein in the step of removing the meshing structures at least 80% of the meshing structures in a width direction are removed by the cutting mechanism.

3. The welding method for straight welds according to claim 1, wherein the cutting mechanism comprises a cutter body (4-1) and a cutting blade (4-2), a lower edge of the cutting blade (4-2) is not higher than a root of the weld.

4. The welding method for straight welds according to claim 3, wherein a rotation direction of the cutting blade (4-2) is a direction allowing swarfs to fly away from the welding gun (2-1).

5. A welding method for circumferential welds with a tack-free welding device which comprises a connecting frame (1), a welding gun (2-1), and a cutting mechanism, wherein the welding gun (2-1) is fixed on the connecting frame (1), the cutting mechanism is fixedly connected to the connecting frame (1) through a pose adjustment mechanism (3), comprising the following steps:

cutting edges of two plates according to a form of a meshing structure for restraining the two plates from moving relative to each other after the two plates are assembled and meshed together, and then coiling the plates; or, coiling the plates first, and then cutting the edges of the plates according to the form of the meshing structure;

assembling and meshing the cut and coiled plates, and fixing the plates by randomly performing tack welding on the meshing structures; or, fixing a round or circular rigid backing on back sides of the meshing structures by performing some tack welding on contact positions of outer edges of the rigid backing and the meshing structure (5-3), so as to obtain a circular structural member;

placing the circular structural member on a rotary table, and adjusting a position of the welding gun (2-1) and a position of the cutting mechanism until the welding gun (2-1) and the cutting mechanism are aligned with a center of a weld; and keeping the cutting mechanism and the welding gun (2-1) fixed, and driving, by the rotary table, the circular structural member to rotate, removing the meshing structures by the cutting mechanism, and then performing, by the welding gun (2-1), welding at the weld in a non-connected area, from an initial point of the welding to a position of the cutting mechanism, formed after the meshing structures are removed.

6. The welding method for straight welds according to claim 1, wherein the meshing structure comprises triangular, rectangular, trapezoidal, sawtooth, or barb-shaped structures that are disposed on the edges of the two plates and matched with each other.

7. The welding method for straight welds according to claim 3, wherein the cutting blade (4-2) is rotatably connected to a lower end of the cutter body.

8. The welding method for straight welds according to claim 1, wherein the cutting mechanism removes the meshing structures one by one, and the welding gun performs welding after one of the meshing structures is removed, and when the cutting mechanism and the welding gun move along a welding direction of the weld, the cutting mechanism removes the meshing structure at front, and the welding gun performs welding at back.

9. The welding method for straight welds according to claim 6, wherein the meshing structure comprises barb-shaped structures that are disposed on the edges of the two plates and matched with each other.

10. The welding method for circumferential welds according to claim 5, wherein the meshing structure comprises triangular, rectangular, trapezoidal, sawtooth, or barb-shaped structures that are disposed on the edges of the two plates and matched with each other.

11. The welding method for straight welds according to claim 1, wherein the cutting mechanism is a laser cutting head.

12. The welding method for straight welds according to claim 1, wherein a width of the meshing structures ranges from 0.5 mm to 6 mm.

* * * * *